J. F. McCLEARY.
COUPLING MEANS FOR RIGID AND FLEXIBLE MEMBERS.
APPLICATION FILED JUNE 8, 1916.
1,233,379.
Patented July 17, 1917.
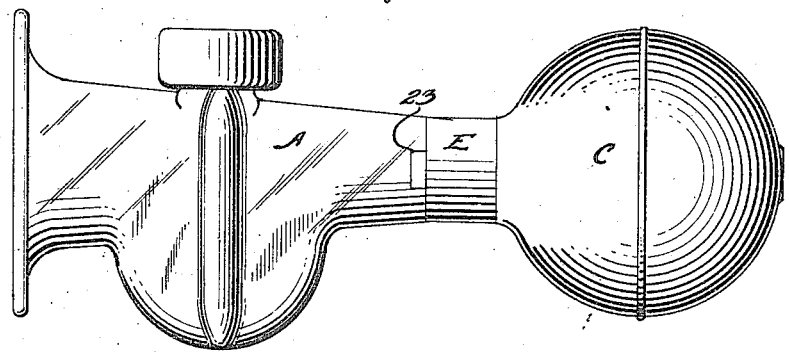
Fig. 1.
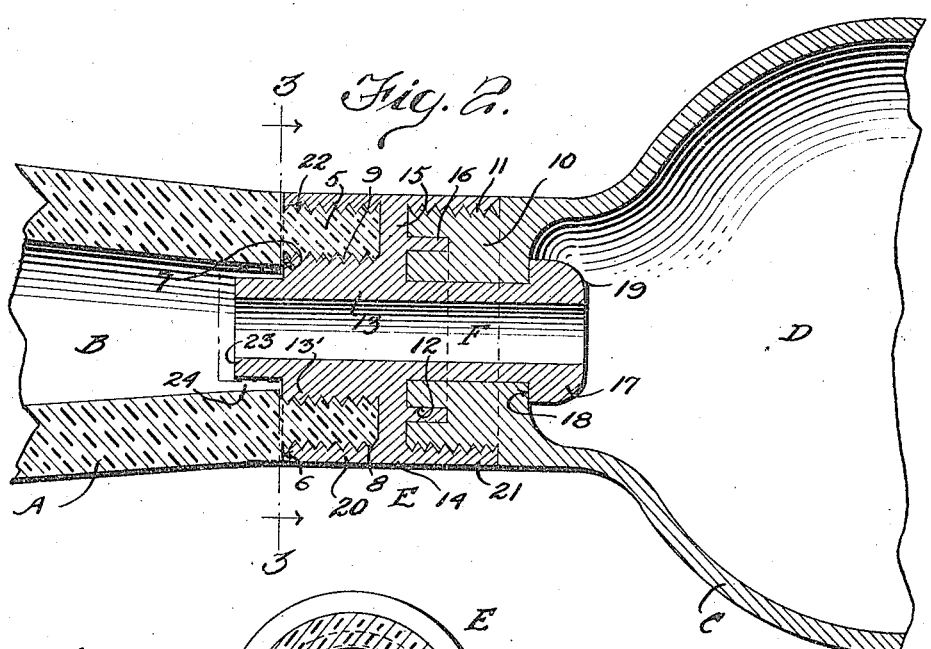
Fig. 2.
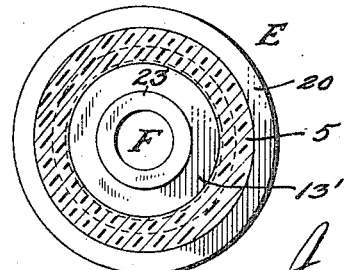
Fig. 3.
Fig. 4.
INVENTOR
Joseph Franklin McCleary,
By Lancaster & Allwine
his ATTORNEYS

UNITED STATES PATENT OFFICE.

JOSEPH FRANKLIN McCLEARY, OF FINDLAY, OHIO.

COUPLING MEANS FOR RIGID AND FLEXIBLE MEMBERS.

1,233,379.      Specification of Letters Patent.      Patented July 17, 1917.

Application filed June 8, 1916. Serial No. 102,579.

*To all whom it may concern:*

Whereas I, JOSEPH FRANKLIN McCLEARY, a citizen of the United States, and resident of Findlay, in the county of Hancock and State of Ohio, have invented a certain new and useful Improvement in Coupling Means for Rigid and Flexible Members, of which the following is a specification.

My present invention relates to coupling means for rigid and flexible members used to contain or conduct fluid, the coupling provided with a way affording communication between the two members.

The principal objects of my invention are to provide a coupling of the character described which affords a fluid-tight connection between the members retaining them in conducting communication; such a coupling as will maintain fluid-tight connection between the members even though the one member be flexed, collapsed, or otherwise acted upon to cause movement of the fluid from one member to the other; and, a coupling which will permit of ready detachment of one member from another, or the separation of the members from the coupling as for cleaning or sterilizing purposes, or for the purpose of replacing a worn or mutilated flexible member without discarding the coupling.

Other objects of my invention are to provide a coupling which is inexpensive to manufacture, neat in appearance, and durable.

Further objects of my invention will appear from the following detailed description, taken in connection with the accompanying drawing, forming a part of this specification, and in which drawing:

Figure 1 is a side elevation of a rigid and a flexible member connected by a coupling constructed according to my invention.

Fig. 2 is an enlarged fragmentary central vertical sectional view through the coupling and adjacent parts of the rigid and flexible members.

Fig. 3 is a sectional view on the line 3—3 of Fig. 2 looking in the direction of the arrows.

Fig. 4 is a fragmentary longitudinal sectional view through a portion of the flexible element.

In the drawing, where similar characters refer to similar parts throughout the several views, A designates a rigid member formed to provide a hollow B; C a flexible member formed to provide a hollow D; and E, a coupling in its preferred formation, and providing a way F between the hollows B and D, and joining the members A and C in a fluid-tight manner.

While I have herein shown the invention as applied to a breast pump, with the member A in the form of a main body portion, and the member C as a bulb made of rubber or other flexible material, it is to be understood that this is merely by way of example, since the coupling means is susceptible of use in connection with various rigid and flexible members which are arranged for intercommunication.

Referring first to the rigid element A, it is provided with an annular extension 5, as a continuation of the hollow B, said extension being preferably less in thickness than the thickness of the wall of member A, so that an external shoulder 6 and an internal shoulder 7 are provided at the base of said extension 5. I prefer to provide screw-threads 8 on the exterior of extension 5, and screw-threads 9 on the interior thereof, as is clearly shown in Fig. 2 of the drawing.

The member C is provided with an annular flange 10 as a continuation of the hollow D, this flange projecting inwardly of the member C. It is preferred to provide screw-threads 11 on the exterior of flange 10, and an annular recess 12 in flange 10 at its face opposite to the hollow D.

The coupling, which may be made of vulcanized rubber, compressed fiber, and cement, or metal such as aluminum, includes a tubular portion 13 which extends into the hollows B and D, with the way F open to said hollows; a sleeve 14 about tubular portion 13; a web 15 connecting sleeve 14 with tubular portion 13, said web being disposed intermediate of the end faces of the tubular portion; and, if desired, an annular lip 16 carried by web 15 and adapted to extend into the annular recess 12 of flexible member C. If desired, a flange 17 may also be provided, integral with tubular portion 13, at the end thereof, interiorly of member C, said flange providing a shoulder 18 against which the interior face of flange 10 engages. This flange 17 is also preferably rounded at its face opposite to shoulder 18, as indicated at 19, facilitating the passage of flexible flange 10 over the flange 17 in assemblage.

It is to be observed that, by the provision of sleeve 14, carried by tubular portion 13 as by web 15, two annular flanges extending from said web and designated 20 and 21 are disposed about the way F. Thus, an annular recess 22 is provided to one side of the web 15, into which the extension 5 of member A may fit, the opposite walls of recess 22, being screw-threaded complemental to the threads 8 and 9 of member A. The flange 21, at the other side of web 15 is internally screw threaded complemental to the threads 11 of flexible member C. If desired, the recess 12 may be relatively narrower than the lip 16 so that as the member C is turned into screw-threaded engagement with the coupling E, the portions of flange 10 adjacent recess 12 will be compressed between lip 16 and flange 21, and lip 16 and tubular portion 13. The tubular portion 13 may also extend interiorly of member A, as at 23, free of the internal periphery of member A, which when the coupling E is in operative relation to member A, forms an annular recess 24, which will serve as a trap preventing the passage of any small quantity of liquid from member A to member C when such flows by gravity toward the member C.

In assemblage, the operator has merely to rotate the member A or coupling E, one with respect to the other, placing the extension 5 into recess 22, and in the example shown, until the flange 20 and enlarged portion 13' of tubular portion 13 engage the shoulders 6 and 7. Thus a fluid-tight joint is provided, yet the member A may be readily detached from the coupling permitting the user to cleanse the member A or in the event it is made of frangible material and becomes broken, it can be replaced by a perfect member. In the assemblage of flexible member C into operative relation to coupling E, the operator proceeds to force the flange 10 upon tubular portion 13, and in the example shown, over flange 17 until the threads 11 engage the flange 21. Then the coupling or member C is rotated one with respect to the other, feeding the flange 10 into the recess formed by flange 21 and tubular portion 13. The lip 16 also engages in the annular recess 12 as hereinbefore described. That portion of the lip 10 adjacent the flange 17 may be forced into place, abutting against shoulder 18 by bringing slight pressure upon the exterior of member C adjacent coupling E. Thus, the coupling E is disposed in fluid-tight engagement with member C but with the way F communicating with the hollows B and D of members A and C, respectively. It is to be observed that, because of the intimate contact of member A with the coupling, and member C in engagement therewith, the fluid cannot pass about flanges 5 and 10, but may pass freely through the way F.

Changes in details may be made without departing from the spirit or scope of my invention; but,

I claim:—

1. In a coupling means of the character described, the combination of a flexible member formed to provide a hollow, and an annular flange as a continuation of said hollow, said flange provided with external screw-threads and formed with an annular recess open at its face opposite to said hollow, and a coupling formed to provide a way in communication with the hollow of said flexible member, an annular flange about said way provided with internal screw-threads complemental to and engaging the said threads of said flexible member, and an annular lip interiorly of said flange, fitting into the said annular recess of the flange of said flexible member.

2. A coupling means of the character described comprising in combination, the flexible member formed to provide a hollow and an annular flange as a continuation of said hollow, said flange formed with external screw-threads and formed with an annular recess open at its face opposite to said hollow; a rigid member formed to provide a hollow; and a coupling formed to provide a way in communication with the hollow of said rigid member and in fluid-tight engagement therewith, an annular flange about said way provided with internal screw-threads complemental to and engaging the said threads of said flexible member, and an annular lip interiorly of said flange fitting into the said annular recess of the flange of said flexible member.

3. A coupling means of the character described comprising in combination, a rigid member formed to provide a hollow and an annular extension as a continuation of said hollow, said extension provided with internal and external screw-threads; a flexible member formed to provide a hollow and an annular flange as a continuation of said hollow; said flange formed with external screw-threads and formed with an annular recess open at its face opposite to said hollow; and a coupling formed to provide a way in communication with the said hollows of said rigid and flexible members, an annular recess about said way, the walls of said recess provided with screw-threads complemental to and engaging said threads of said rigid member, an annular flange about said way provided with internal screw-threads complemental to and engaging the said threads of said flexible member, and an annular lip interiorly of said flange of said coupling, said lip fitting into the recess of said flange of said flexible member.

4. A coupling means of the character described comprising in combination, a rigid member formed to provide a hollow and an annular extension as a continuation of said hollow, said extension provided with internal and external screw-threads; a flexible member formed to provide a hollow and an annular flange as a continuation of said hollow; said flange formed with external screw-threads and formed with an annular recess open at its face opposite to said hollow; and a coupling including a tubular portion extending into the said hollows of said rigid and flexible members, a sleeve about said tubular portion, a web connecting said sleeve with said tubular portion intermediate the end faces of the former, said sleeve provided with internal screw-threads complemental to and engaging the said external screw-threads of said members, said tubular portion externally threaded at that portion to one side of the said web, nearest the said rigid member, and in engagement with the said internal screw-threads thereof, and an annular lip carried by said web at the side thereof nearest said flexible member, said lip fitting into the said annular recess of the flange of said flexible member.

5. A coupling means of the character described comprising in combination, a rigid member formed to provide a hollow and an annular extension as a continuation of said hollow, said extension provided with internal and external screw-threads; a flexible member formed to provide a hollow and an annular flange as a continuation of said hollow; and a coupling including a tubular portion extending into the said hollows of said rigid and flexible members, a flange integral with said tubular portion at one end thereof interiorly of said flexible member, said flange providing a shoulder against which the interior face of the said flange of said flexible member engages, a sleeve about said tubular portion, a web connecting said sleeve with said tubular portion intermediate the end faces of the former, said sleeve provided with internal screw-threads complemental to and engaging the said external screw-threads of said members, said tubular portion exteriorly threaded at that portion to one side of said web, nearest the said rigid member, and in engagement with the said internal screw-threads thereof, and an annular lip carried by said web at the side thereof nearest said flexible member, said lip fitting into the said annular recess of the flange of said flexible member.

JOSEPH FRANKLIN McCLEARY.

Copies of this patent may be obtained for five cents each, by addressing the "Commissioner of Patents, Washington, D. C."